US012194767B2

(12) United States Patent
Watanabe

(10) Patent No.: US 12,194,767 B2
(45) Date of Patent: Jan. 14, 2025

(54) METHOD FOR PRODUCING TRANSFER SHEET, AND AQUEOUS ADHESIVE LIQUID

(71) Applicant: RISO KAGAKU CORPORATION, Tokyo (JP)

(72) Inventor: Yoshifumi Watanabe, Tokyo (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 18/359,769

(22) Filed: Jul. 26, 2023

(65) Prior Publication Data

US 2024/0042783 A1 Feb. 8, 2024

(30) Foreign Application Priority Data

Jul. 28, 2022 (JP) ................................. 2022-120733

(51) Int. Cl.

*B32B 3/10* (2006.01)
*B41M 3/12* (2006.01)
*B41M 5/00* (2006.01)
*B41M 7/00* (2006.01)

(52) U.S. Cl.

CPC ............ *B41M 5/0047* (2013.01); *B41M 3/12* (2013.01); *B41M 7/0018* (2013.01)

(58) Field of Classification Search

None
See application file for complete search history.

(56) References Cited

U.S. PATENT DOCUMENTS

| | | | | |
|---|---|---|---|---|
| 2012/0156444 | A1* | 6/2012 | Takemoto | B41M 3/12 347/21 |
| 2019/0185662 | A1* | 6/2019 | Zhou | B32B 27/36 |
| 2021/0017429 | A1* | 1/2021 | Ishizuka | B41M 5/504 |

FOREIGN PATENT DOCUMENTS

| | | |
|---|---|---|
| JP | 2012-126025 | 7/2012 |
| JP | 2013-059974 | 4/2013 |

* cited by examiner

*Primary Examiner* — Christopher M Polley
(74) *Attorney, Agent, or Firm* — HSML P.C.

(57) ABSTRACT

A method for producing a transfer sheet is provided that yields excellent fastness properties in the transferred product for the image transferred from the transfer sheet. The method for producing a transfer sheet includes: forming an image by jetting an aqueous ink by an inkjet method onto a releasable support, and jetting an aqueous adhesive liquid by an inkjet method so as to at least partially overlap the image, wherein the aqueous adhesive liquid contains a resin A, and a resin B having a glass transition temperature that is at least 80° C. higher than that of the resin A.

7 Claims, 1 Drawing Sheet

METHOD FOR PRODUCING TRANSFER SHEET, AND AQUEOUS ADHESIVE LIQUID

CROSS REFERENCE TO RELATED APPLICATIONS

This application is based upon and claims the benefit of priority from prior Japanese Patent Applications No. 2022-120733 filed on Jul. 28, 2022, the entire contents of which are incorporated by reference herein.

BACKGROUND OF THE INVENTION

Field of the Invention

The disclosure relates to a method for producing a transfer sheet, and an aqueous adhesive liquid.

Description of the Related Art

Methods which use a transfer sheet having an image layer formed on a releasable support, wherein the transfer sheet is superimposed on a transfer target object, and a heat treatment or the like is then conducted to transfer the image to the transfer target object are already known. More specifically, by forming an image layer on a releasable support and then applying an adhesive on top of the image layer, when the transfer to the transfer target object is conducted, the image layer adheres to the transfer target object via the adhesive, and the image detaches from the releasable support and transfers to the transfer target object.

However, if the adhesive is also applied to locations on the releasable support outside of the image formation region, then when the image is transferred from the releasable support to the transfer target object, the adhesive also adheres to the transfer target object in locations outside of the transferred image formation region, which can cause problems such as stickiness on the transfer target object in those locations and impairment of the external appearance.

In order to reduce the occurrence of these problems, methods have been proposed in which the adhesive is applied only on top of the image formed on the releasable support. Patent Document 1 (JP 2012-126025 A) and Patent Document 2 (JP 2013-59974 A) disclose methods in which an inkjet method is used to adhere an ink to a sheet and form a pattern, and an inkjet method is then used to apply an adhesive only on top of that pattern.

SUMMARY OF THE INVENTION

An object of the disclosure is to provide a method for producing a transfer sheet that yields excellent fastness properties for the transferred image in the transferred product, and also to provide an aqueous adhesive liquid that is used in the production method.

Some of the embodiments of the disclosure are described below.

(1) A method for producing a transfer sheet, the method including: forming an image by jetting an aqueous ink by an inkjet method onto a releasable support, and jetting an aqueous adhesive liquid by an inkjet method so as to at least partially overlap the image, wherein the aqueous adhesive liquid contains a resin A, and a resin B having a glass transition temperature that is at least 80° C. higher than that of the resin A.

(2) The method for producing a transfer sheet according to (1), wherein the glass transition temperature of the resin A is less than 0° C., or the glass transition temperature of the resin B exceeds 95° C.

(3) The method for producing a transfer sheet according to (1), wherein the glass transition temperature of the resin A is less than 0° C., and the glass transition temperature of the resin B exceeds 95° C.

(4) The method for producing a transfer sheet according to any one of (1) to (3), wherein the resin A and the resin B are each, independently, a urethane-based resin or a (meth)acrylic-based resin.

(5) The method for producing a transfer sheet according to any one of (1) to (4), wherein the mass ratio of the resin A:the resin B is within a range from 50:50 to 90:10.

(6) An aqueous adhesive liquid used in a method for producing a transfer sheet that includes forming an image by jetting an aqueous ink by an inkjet method onto a releasable support, and applying the aqueous adhesive liquid by an inkjet method so as to at least partially overlap the image, wherein the aqueous adhesive liquid contains a resin A, and a resin B having a glass transition temperature that is at least 80° C. higher than that of the resin A.

(7) A transfer sheet including a releasable support, and a laminate that is formed on top of the releasable support and includes an image layer and an adhesive layer, wherein the adhesive layer contains a resin A, and a resin B having a glass transition temperature that is at least 80° C. higher than that of the resin A.

(8) The transfer sheet according to (7), wherein the releasable support includes a substrate and a protective layer that is formed on the substrate in a releasable manner, and the laminate is formed on top of the protective layer.

(9) A transferred product including a transfer target object, and an image which, using the transfer sheet according to (7) or (8), has been transferred from the transfer sheet to the transfer target object.

Some of the embodiments of the disclosure are able to provide a method for producing a transfer sheet that yields excellent fastness properties in the transferred product for the image transferred from the transfer sheet, and also provide an aqueous adhesive liquid that is used in the production method.

DETAILED DESCRIPTION OF THE EMBODIMENTS

Figure 1A:
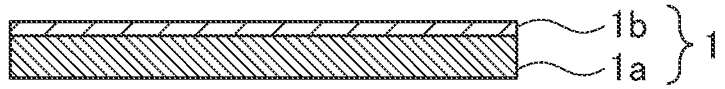
FIG. 1A to FIG. 1D are cross-sectional views schematically illustrating a transfer sheet and transferred product according to one of the embodiments at each stage of the production method.

Embodiments of the disclosure are described below. However, the disclosure is not limited to the examples presented in the following embodiments.

A method for producing a transfer sheet according to one embodiment includes: forming an image by jetting an aqueous ink by an inkjet method onto a releasable support, and jetting an aqueous adhesive liquid by an inkjet method so as to at least partially overlap the image, wherein the aqueous adhesive liquid contains a resin A, and a resin B having a glass transition temperature that is at least 80° C. higher than that of the resin A. By employing this production method, a method for producing a transfer sheet can be provided that yields excellent fastness properties in the transferred product for the image transferred from the transfer sheet.

By including the resin A with a low glass transition temperature (Tg) and the resin B with a high glass transition temperature, and ensuring that the difference between the glass transition temperature of the resin A and the glass transition temperature of the resin B is at least 80° C., an appropriate balance can be achieved between the adhesion to the transfer target object, and the strength of the adhesive layer in the transferred product. More specifically, by including the resin A with a low glass transition temperature in the aqueous adhesive liquid, the adhesion of the resulting transfer sheet to transfer target objects can be improved. Further, by also including the resin B with a high glass transition temperature in the aqueous adhesive liquid, the strength of the adhesive layer in the transferred product bearing the image that has been transferred from the transfer sheet can be improved. As a result, transferred products having excellent transferability and fastness properties can be obtained for transfer target objects of various materials, from soft transfer target objects having elasticity such as fabrics, through to hard transfer target objects such as wood, metals, glass, plastics and ceramics.

In terms of the actions and effects described above, it is thought that the resin A with a low glass transition temperature fits well with any uneven shapes in the surface of the transfer target object, causing a wedge effect that yields an adhesion improvement effect. Further, in the state where the aqueous adhesive liquid has been applied to the transfer sheet, it is thought that the resin B with a high glass transition temperature exists in an island-like state within a matrix of the resin A, and has a function of undergoing plastic deforming and absorbing energy when external forces are applied, resulting in an effect that suppresses cohesive failure of the adhesive layer. It is important that the interface strength between the resin B with the high glass transition temperature and the resin A with the low glass transition temperature is designed so that interfacial peeling of the resin B from the matrix of the resin A does not occur in the period prior to the resin B undergoing plastic deformation.

In a preferred embodiment, when a resin having a glass transition temperature of less than 0° C. is used as the resin A, a particularly superior adhesion effect can be achieved. Further, when a resin having a glass transition temperature exceeding 95° C. is used as the resin B, particularly superior adhesive layer strength can be obtained. In an even more preferred embodiment, when a resin B with a glass transition temperature exceeding 95° C. is used in combination with a matric of a resin A with a glass transition temperature of less than 0° C., the interface strength can be maintained at a high level, and the toughness of the adhesive layer in the transferred product can be enhanced, while the adhesive strength is also increased.

In Patent Document 1 (JP 2012-126025 A) and Patent Document 2 (JP 2013-59974 A), although mention is made of transferability, adhesiveness and blocking resistance, there is no mention of the fastness properties, and the fastness performance tends to be unsatisfactory.

[Transfer Sheet]

Figure 1B:
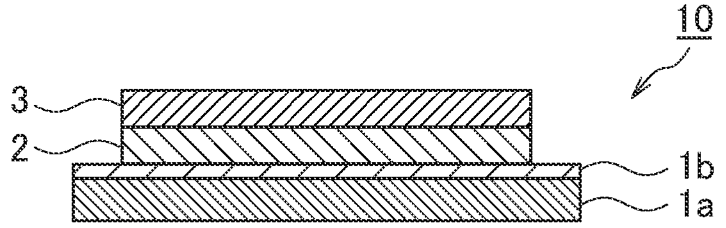
Figure 1C:
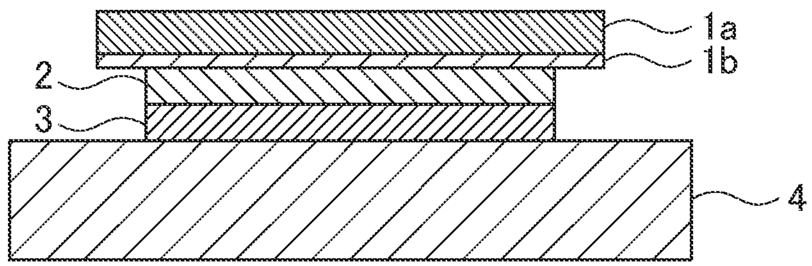
Figure 1D:
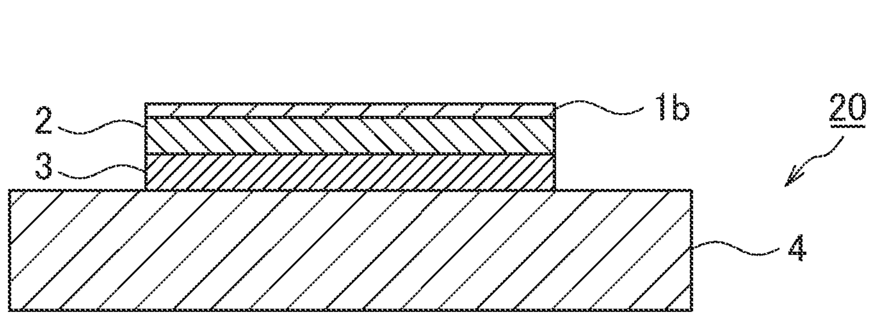

One embodiment of the transfer sheet is described using the drawings. FIG. 1 is a cross-sectional view schematically illustrating a transfer sheet and transferred product according to one of the embodiments at each stage of the production method. In FIG. 1, 10 indicates the transfer sheet, 20 indicates the transferred product, 1 indicates the releasable support, 2 indicates the image layer formed on the releasable support, 3 indicates the adhesive layer formed on top of the image layer, and 4 indicates the transfer target object to which the image is transferred from the transfer sheet. The releasable support 1 includes a substrate 1*a* and a protective layer 1*b* formed on top of the substrate 1*a*.

In the example illustrated in FIG. 1, the method for producing the transfer sheet 10 includes (FIG. 1A) preparing the releasable support 1, and (FIG. 1B) forming the image layer 2 and the adhesive layer 3 on the releasable support 1. Further, in the example illustrated in FIG. 1, the method for producing the transferred product 20 includes (FIG. 1C) affixing the transfer sheet to the surface of the transfer target object 4, and (FIG. 1D) detaching the releasable support 1.

[Aqueous Adhesive Liquid]

In one embodiment, in a method in which an aqueous ink and the aqueous adhesive liquid are both jetted onto the releasable support using an inkjet method, the aqueous adhesive liquid contains the resin A and the resin B which has a glass transition temperature (Tg) that is at least 80° C. higher than that of the resin A. In the aqueous adhesive liquid, by ensuring that the difference between the glass transition temperatures of the resin A and the resin B [(glass transition temperature of resin B)−(glass transition temperature of resin A)] is at least 80° C., the transferability of the image from the transfer sheet to the transfer target object can be improved, and the fastness properties of the image on the transferred product bearing the transferred image can also be improved. This difference between the glass transition temperatures of the resin A and the resin B is more preferably at least 90° C., at least 100° C., at east 110° C., or 120° C. or greater.

In the aqueous adhesive liquid, although there are no particular limitations on the difference between the glass transition temperatures of the resin A and the resin B, from the viewpoints of reducing resin stickiness on the transfer sheet and ensuring favorable adhesion, the difference is preferably not more than 200° C., not more than 150° C., or 130° C. or less.

In the aqueous adhesive liquid, the glass transition temperature of the resin A is preferably less than 0° C., and may be −5° C. or lower, −10° C. or lower, −15° C. or lower, or −20° C. or lower. Within these ranges, the adhesion of the transfer sheet to transfer target objects can be further improved. In the aqueous adhesive liquid, the glass transition temperature of the resin B preferably exceeds 95° C., and may be at least 98° C. or 100° C. or higher. Within these ranges, the strength of the image layer in the transferred product bearing the image that has been transferred from the transfer sheet can be further increased.

In the aqueous adhesive liquid, it is preferable that the glass transition temperature of the resin A is less than 0° C., or that the glass transition temperature of the resin B exceeds 95° C. In the aqueous adhesive liquid, it is more preferable that the glass transition temperature of the resin A is less than 0° C. and the glass transition temperature of the resin B exceeds 95° C. As a result, as described above, the toughness of the adhesive layer in the transferred product can be enhanced, while the adhesive strength is also increased.

In this disclosure, the glass transition temperature (Tg) is measured by differential scanning calorimetry (DSC). More specifically, the glass transition temperature is measured using the method described below. A thermoanalyzer manufactured by Rigaku Corporation (Thermoplus EVO2 DSC8231) or the like can be used for the differential scanning calorimetry measurements. In terms of measurement conditions, the measurement sample is typically prepared by heating the sample from room temperature to 200°

C. at a rate of temperature increase of 10° C./minute, and then cooling the sample from 200° C. to −50° C. at a rate of temperature decrease of 10° C./minute. Subsequently, the prepared measurement sample is heated at a rate of temperature increase of 10° C./minute, and the glass transition temperature is defined as the temperature at the intersection between the extension of the baseline at temperatures below the endothermic maximum peak temperature, and the tangent that represents the maximum slope between the start of the rise in peak temperature and the peak apex.

Further, in the case of resins for which measurement of the glass transition temperature by differential scanning calorimetry (DSC) is difficult, the glass transition temperature measured by dynamic viscoelasticity measurement may be used. A dynamic viscoelasticity measurement apparatus manufactured by UBM Co., Ltd. (Rheogel-E4000) or the like can be used for the dynamic viscoelasticity measurement. Measurement conditions include a frequency of 10 Hz and a rate of temperature increase of 2° C./minute, and the glass transition temperature is defined as the temperature at the point where the loss modulus (E") in the dynamic viscoelasticity reaches a maximum.

The resin contained in the aqueous adhesive liquid may be composed of only two types of resins, namely the resin A and the resin B, or may be composed of three or more types of resins including the resin A and the resin B, as well as one, or two or more, additional resins. For example, in those cases where the aqueous adhesive liquid includes three types of resins, if the resin having the lowest glass transition temperature is deemed the resin A, and the resin having a glass transition temperature that is at least 80° C. higher than that of the resin A is deemed the resin B, then the glass transition temperature of the third may be within a range between the glass transition temperatures of the resin A and the resin B, may be higher than the glass transition temperature of the resin B, or may be the same as the glass transition temperature of either the resin A or the resin B.

The reduction in stickiness is dependent on the resin having the highest glass transition temperature, and the adhesion is dependent on the resin having the lowest glass transition temperature. Accordingly, the glass transition temperature of the resin having the lowest glass transition temperature is preferably less than 0° C., and may be −5° C. or lower, −10° C. or lower, −15° C. or lower, or −20° C. or lower. Within these ranges, the adhesion of the transfer sheet to the transfer target object can be further improved. The glass transition temperature of the resin having the highest glass transition temperature preferably exceeds 95° C., and may be at least 98° C. or 100° C. or higher. Within these ranges, the strength of the image layer in the transferred product bearing the image that has been transferred from the transfer sheet can be further increased.

In the aqueous adhesive liquid, the resin A and the resin B are both preferably adhesive resins, and more specifically, are preferably thermoplastic resins. Each of the resin A and the resin B may be a water-dispersible resin or a water-soluble resin, but in terms of having a lower viscosity and better storage stability in the aqueous adhesive liquid, and exhibiting superior adhesion, a water-dispersible resin is preferred. The resin A and the resin B may each be an anionic resin, a cationic resin, an amphoteric resin or a nonionic resin, and a combination of these resin types may also be used. Each of the resin A and the resin B is preferably a resin that forms a transparent coating film on the releasable support. As a result, any effect on the coloration of the aqueous ink on the transferred product bearing the image transferred from the transfer sheet can be reduced.

A water-dispersible resin is a resin that can be dispersed within the aqueous adhesive liquid in the form of resin particles, and can preferably be added to the aqueous adhesive liquid in the form of a resin emulsion. In order to ensure stable dispersion within water, the water-dispersible resin may be a self-emulsifying resin containing introduced hydrophilic groups and/or a hydrophilic segment, or may be converted to a water-dispersible form by using an external emulsifier.

In those cases where the water-dispersible resin forms resin particles within the aqueous adhesive liquid, from the viewpoint of the inkjet jetting characteristics, the average particle size of the resin particles is preferably not more than 500 nm, more preferably not more than 300 nm, and even more preferably 150 nm or less. For example, the average particle size of the resin particles may be within a range from 10 nm to 500 nm. Further, the average particle size of the resin particles in a resin emulsion added to the aqueous adhesive liquid preferably also satisfies these ranges. In this disclosure, the average particle size of the resin particles refers to the volume-based average particle size, and is a numerical value measured by the dynamic light-scattering method.

Examples of the water-dispersible resin include conjugated diene-based resins such as styrene-butadiene copolymers, methyl methacrylate-butadiene copolymers, and vinyl chloride-vinyl acetate copolymers; (meth)acrylic-based resins; vinyl-based resins such as ethylene-vinyl acetate copolymers; urethane-based resins; as well as melamine resins, urea resins, polyester resins, polyolefin resins, silicone resins, polyvinyl butyral resins, and alkyd resins; or functional group-modified resins prepared by modifying any of these types of resins with a monomer containing a functional group such as a carboxyl group. By either introducing a hydrophilic functional group into these resins, or performing a surface treatment with a dispersant or the like, an oil-in-water resin emulsion can be formed, and this emulsion may be added to the aqueous adhesive liquid.

Examples of water-soluble resins include polyvinyl alcohol, poly(meth)acrylic acid, neutralized products of poly(meth)acrylic acid, (meth)acrylic acid/maleic acid copolymers, (meth)acrylic acid/sulfonic acid copolymers, and styrene/maleic acid copolymers.

The weight average molecular weight (Mw) of the water-dispersible resin is not particularly limited, but is preferably within a range from 3,000 to 1,000,000, more preferably from 5,000 to 500,000, and even more preferably from 10,000 to 300,000. However, in those cases where the resin has a crosslinked structure within the molecule, measurement may sometimes be difficult, and so there are no particular limitations on the upper limit. In this disclosure, weight average molecular weight values for resins represent polystyrene-equivalent values measured by a gel permeation (GPC) method.

From the viewpoints of the coating characteristics and adhesiveness of the aqueous adhesive liquid, the resin A and the resin B are each preferably a urethane-based resin or a (meth)acrylic-based resin. Moreover, urethane-based resins and (meth)acrylic-based resins can further improve the coating film strength and flexibility of the laminate of the image layer and the adhesive layer in the transferred product bearing the image transferred from the transfer sheet. Further, from the viewpoints of the coating characteristics and the adhesiveness, resin A and the resin B are each preferably a water-dispersible resin. Furthermore, water-dispersible resins are able to better suppress any viscosity increase and further improve the storage stability of the aqueous adhesive liquid. Among the various possibilities, the resin A and the resin B are each preferably a water-dispersible urethane-based resin or a water-dispersible (meth)acrylic-based resin.

Urethane-based resins are resins having a urethane skeleton, and besides the urethane skeleton, the urethane-based resin is preferably a polyether urethane-based resin containing ether linkages within the main chain, a polyester urethane-based resin containing ester linkages within the main chain, a polycarbonate urethane-based resin containing carbonate linkages within the main chain, or a polyester-ether urethane-based resin containing ester linkages and ether linkages within the main chain.

The product of a reaction between a polyisocyanate and a polyol may be used as the urethane-based resin. This reaction may be conducted in accordance with conventional methods. A single urethane-based resin may be used alone, or a combination of two or more resins may be used. There are no particular limitations on the above polyisocyanate, provided the compound has at least two isocyanate groups in the molecule.

The term polyisocyanate includes, for example, aliphatic polyisocyanates, alicyclic polyisocyanates, aromatic polyisocyanates, and araliphatic polyisocyanates and the like. A single polyisocyanate may be used alone, or a combination of two or more polyisocyanates may be used. Dimers, trimers, reaction products, modified forms, or polymers of the above polyisocyanates may also be used as the polyisocyanate.

Examples of the above polyol include low-molecular weight polyols; and long-chain polyols such as polyether polyols, polyester polyols, polycarbonate polyols, polyolefin polyols and polyacrylic polyols. A single type of low-molecular weight polyol or long-chain polyol may be used alone, or a combination of two or more types may be used.

Furthermore, the urethane-based resin may also be used in combination with a chain extender or a reaction terminator. There are no particular limitations on the chain extender, and any compound having two or more active groups that can react with isocyanate groups may be used, although generally a polyol or polyamine can be used. Further, a monoalcohol or monoamine may be used as the reaction terminator.

A (meth)acrylic urethane-based resin may also be used as one example of the urethane-based resin. In this disclosure, a (meth)acrylic urethane-based resin is not classified as a (meth)acrylic-based resin, but rather as a urethane-based resin.

Examples of (meth)acrylic urethane-based resins include copolymers of a (meth)acrylic-based resin and a urethane-based resin. One specific example is a copolymer produced by polymerizing a urethane prepolymer and a (meth)acrylate to introduce (meth)acrylate units or a side chain with a poly(meth)acrylic structure into the urethane skeleton. Examples of the urethane prepolymer include prepolymers synthesized using a polyisocyanate and polyol described above. Examples of the (meth)acrylate include the types of compounds described below in relation to (meth)acrylic-based resins. Another example is a copolymer produced by reacting a polyol and a polyisocyanate with a (meth)acrylic-based resin having hydroxyl groups to introduce a polyurethane skeleton into the (meth)acrylate-based resin. Examples of the (meth)acrylic-based resin having hydroxyl groups include the types of compounds described below in relation to (meth)acrylic-based resins. Examples of the polyol and the polyisocyanate include the polyisocyanates and polyols mentioned above.

An emulsion-type urethane-based resin is preferably used as the urethane-based resin. This emulsion-type urethane-based resin may be either a forcible emulsified urethane-based resin that uses a surfactant as an emulsifier, or a self-emulsifying urethane-based resin having introduced hydrophilic groups within the resin. Among these possibilities, self-emulsifying urethane-based resins are particularly preferred as the emulsion-type urethane-based resin. Examples of the hydrophilic groups in the self-emulsifying urethane-based resin include sulfonate groups, carboxyl groups, hydroxyl groups, polyethyleneoxy groups, amino groups, and mono- or di-substituted amino groups. Among these, sulfonate groups, carboxyl groups, hydroxyl groups and polyethyleneoxy groups are preferred as the hydrophilic groups.

Examples of compounds that may be used as the (meth)acrylic-based resin include homopolymers or copolymers having methacrylic units and/or acrylic units, as well as copolymers having one or more other units besides the methacrylic units and/or acrylic units (ethylenic unsaturated monomers). The (meth)acrylic-based resin can be obtained by polymerization using a (meth)acrylic monomer. The polymerization may be conducted in accordance with conventional methods.

Examples of the (meth)acrylic monomer include alkyl (meth)acrylate esters, cycloalkyl (meth)acrylate esters, alkoxyalkyl (meth)acrylate esters, aralkyl (meth)acrylate esters, aryl (meth)acrylate esters, and hydroxy group-containing (meth)acrylate esters, as well as other (meth)acrylate esters such as polyalkylene glycol (meth)acrylates, alkyl (meth)acrylate esters having a halogen atom, (meth)acrylate esters having an amino group, (meth)acrylate esters having an epoxy group and derivatives thereof, (meth)acrylates having a sulfonic acid group, (meth)acrylates having a phosphoric acid group, (meth)acrylates having an isocyanate group, (meth)acrylates having a heterocycle, and alkyl group- or aryl group-terminated polyalkylene glycol mono (meth)acrylates. In the synthesis of the (meth)acrylic resin, one of these monomers may be used alone, or a combination of two or more monomers may be used.

Further, one or more monomers other than a (meth)acrylic monomer (hereinafter referred to as "other monomers") may be used in combination with the (meth)acrylic monomer. There are no particular limitations on these other monomers, provided they are capable of copolymerization with the (meth)acrylic monomer, and examples include unsaturated carboxylic acid-based monomers, styrene-based monomers, unsaturated monomers having a nitrogen atom, vinyl-based monomers, unsaturated alcohols, vinyl ether-based monomers, vinyl ester-based monomers, unsaturated monomers having an epoxy group, unsaturated monomers having a sulfonic acid group, and alkoxysilyl group-containing ethylenic unsaturated monomers. Moreover, monomers having two or more polymerizable double bonds (polyfunctional monomers) may also be used. One of these other monomers may be used alone in the synthesis of the (meth)acrylic-based resin, or a combination of two or more other monomers may be used.

One example of a (meth)acrylic resin that may be used is a styrene (meth)acrylic-based resin. Examples of styrene (meth)acrylic-based resins include copolymers of styrene and a (meth)acrylate. The (meth)acrylate may be a single compound or a combination of two or more compounds selected from among those compounds described above.

The (meth)acrylic resin is preferably a water-dispersible (meth)acrylic-based resin, and is preferably added to the aqueous adhesive liquid in the form of an oil-in-water emulsion.

Examples of commercially available resins having a glass transition temperature (Tg) of less than 0° C. are listed below. Examples of urethane-based resins include products manufactured by DKS Co., Ltd., such as SUPERFLEX 300 (anionic, Tg: −42° C.), SUPERFLEX 420 (anionic, Tg: −10° C.), SUPERFLEX 420NS (anionic, Tg: −10° C.), SUPERFLEX 460 (anionic, Tg: −21° C.), SUPERFLEX 460S (anionic, Tg: −28° C.), SUPERFLEX 470 (anionic, Tg: −31° C.), SUPERFLEX 500M (nonionic, Tg: −39° C.), SUPERFLEX 650 (cationic, Tg: −17° C.), SUPERFLEX 740 (anionic, Tg: −34° C.), SUPERFLEX E-2000 (nonionic, Tg: −38° C.), and SUPERFLEX E-4800 (nonionic, Tg: −65° C.), as well as TAKELAC W-6110 (anionic, Tg: −20° C.) manufactured by Mitsui Chemicals Inc. (wherein all of the above represent brand names).

Examples of (meth)acrylic-based resins include products manufactured by Japan Coating Resin Corporation, such as Mowinyl 702 (anionic, Tg: −19° C.), Mowinyl 7525 (anionic, Tg: −16° C.), Mowinyl LDM7522 (anionic, Tg: −15° C.), Mowinyl LDM7010 (anionic, Tg: −22° C.), Mowinyl 461 (anionic, Tg: −48° C.), Mowinyl 462 (anionic, Tg: −48° C.), Mowinyl 490 (anionic, Tg: −53° C.), Mowinyl 987B (anionic, Tg: −2° C.), Mowinyl S-71 (anionic, Tg: −53° C.), Mowinyl 718A (anionic, Tg: −6° C.), Mowinyl 730L (nonionic, Tg: −13° C.), Mowinyl 7320 (anionic, Tg: −20° C.), Mowinyl 7400 (anionic, Tg: −41° C.), and Mowinyl 7420 (anionic, Tg: −26° C.) (wherein all of the above represent brand names).

Examples of styrene acrylic-based resins include NeoCryl A-1120 (anionic, Tg: −9° C.) manufactured by DSM N.V., and products manufactured by Japan Coating Resin Corporation, such as Mowinyl 6730 (anionic, Tg: −2° C.), Mowinyl 7502 (anionic, Tg: −35° C.), Mowinyl VDM7410 (anionic, Tg: −4° C.), and Mowinyl 6960 (anionic, Tg: −23° C.) (wherein all of the above represent brand names).

Examples of commercially available resins having a glass transition temperature (Tg) exceeding 95° C. are listed below. Examples of urethane-based resins include SUPERFLEX 130 (anionic, Tg: 101° C.) manufactured by DKS Co., Ltd., products manufactured by Mitsui Chemicals Inc., such as TAKELAC W-405 (anionic, Tg: 135° C.), TAKELAC W-605 (anionic, Tg: 100° C.), TAKELAC WS-4000 (anionic, Tg: 136° C.), TAKELAC WS-4022 (anionic, Tg: 115° C.) and TAKELAC WS-5100 (anionic, Tg: 120° C.), and DAOTAN TW 6493 (anionic, Tg: 100° C.) manufactured by Daicel-Allnex Ltd. (wherein all of the above represent brand names).

Examples of (meth)acrylic-based resins include NeoCryl XK-52 (brand name) (anionic, Tg: 108° C.) manufactured by DSM N.V. Examples of styrene acrylic-based resins include Mowinyl 972 (brand name) (anionic, Tg: 101° C.) manufactured by Japan Coating Resin Corporation.

Examples of commercially available resins having a glass transition temperature (Tg) of at least 0° C. but not more than 95° C. are listed below. Examples of urethane-based resins include products manufactured by DKS Co., Ltd., such as SUPERFLEX 126 (anionic, Tg: 72° C.), SUPERFLEX 150 (anionic, Tg: 40° C.), SUPERFLEX 150HS (anionic, Tg: 32° C.), SUPERFLEX 170 (anionic, Tg: 75° C.), SUPERFLEX 210 (anionic, Tg: 41° C.), SUPERFLEX 620 (anionic, Tg: 43° C.), SUPERFLEX 820 (anionic, Tg: 46° C.), SUPERFLEX 830HS (anionic, Tg: 68° C.), SUPERFLEX 860 (anionic, Tg: 36° C.), and SUPERFLEX 870 (anionic, Tg: 78° C.), and products manufactured by Mitsui Chemicals Inc., such as TAKELAC W-5030 (anionic, Tg: 85° C.), TAKELAC W-5661 (anionic, Tg: 70° C.), TAKELAC W-6010 (anionic, Tg: 90° C.), TAKELAC W-6020 (anionic, Tg: 90° C.), TAKELAC W-6061 (anionic, Tg: 25° C.), TAKELAC W-635 (anionic, Tg: 70° C.), and TAKELAC WS-5984 (anionic, Tg: 70° C.) (wherein all of the above represent brand names).

Examples of (meth)acrylic-based resins include products manufactured by Japan Coating Resin Corporation, such as Mowinyl 727 (anionic, Tg: 5° C.), Mowinyl 742A (anionic, Tg: 45° C.), Mowinyl 743N (anionic, Tg: 37° C.), Mowinyl 745 (anionic, Tg: 21° C.), Mowinyl 1711 (anionic, Tg: 30° C.), Mowinyl 6520 (anionic, Tg: 41° C.), Mowinyl 6530 (anionic, Tg: 30° C.), Mowinyl 7180 (anionic, Tg: 53° C.), Mowinyl 7470 (nonionic, Tg: 42° C.), Mowinyl 7720 (nonionic, Tg: 4° C.), Mowinyl 7820 (cationic, Tg: 4° C.), Mowinyl DM772 (anionic, Tg: 6° C.), Mowinyl DM774 (anionic, Tg: 13° C.), Mowinyl LDM7156 (anionic, Tg: 37° C.), Mowinyl LDM7520 (anionic, Tg: 4° C.), Mowinyl 7980 (anionic, Tg: 55° C.), Mowinyl 735 (anionic, Tg: 14° C.), Mowinyl 747 (nonionic, Tg: 42° C.), Mowinyl LDM7582 (nonionic, Tg: 26° C.), Mowinyl 710A (anionic, Tg: 9° C.), and Mowinyl 731A (nonionic, Tg: 0° C.), and NeoCryl A1105 (anionic, Tg: 93° C.) manufactured by DSM N.V. (wherein all of the above represent brand names).

Examples of styrene acrylic-based resins include products manufactured by Japan Coating Resin Corporation, such as Mowinyl 749E (anionic, Tg: 25° C.), Mowinyl 752 (anionic, Tg: 15° C.), Mowinyl 880 (anionic, Tg: 3° C.), Mowinyl 940 (anionic, Tg: 3° C.), Mowinyl 1752 (anionic, Tg: 16° C.), Mowinyl 1760 (anionic, Tg: 7° C.), Mowinyl 6720 (anionic, Tg: 34° C.), Mowinyl DM60 (anionic, Tg: 3° C.), and Mowinyl 975N (anionic, Tg: 27° C.) (wherein all of the above represent brand names).

Examples of commercially available products of water-dispersible (meth)acrylic urethane-based resins include products manufactured by Daicel-Allnex Ltd., such as DAOTAN TW 6462, DAOTAN VTW 6463, DAOTAN VTW 6464, DAOTAN VTW 6471, DAOTAN VTW 6473, DAOTAN VTW 6474, DAOTAN VTW 1262, and DAOTAN VTW 1265 (wherein all of the above represent brand names).

Moreover, examples of commercially available products of resins that can be added to the aqueous adhesive liquid as oil-in-water resin emulsions are listed below. Examples of ethylene-vinyl acetate copolymers include products manufactured by Sumitomo Chemical Co., Ltd., such as the SUMIKAFLEX series (201HQ, 305HQ, 355HQ, 400HQ, 401HQ, 408HQ, 410HQ, 450HQ, 455HQ, 456HQ, 460HQ, 465HQ, 467HQ, 470HQ, 510HQ, 520HQ, 752 and 755), products manufactured by Nissin Chemical Industry Co., Ltd., such as the VINYBLAN series (3483Y, 4018, 4495L and 4495H), and products manufactured by Showa Denko K.K., such as the Polysol series (EVA AD-2, EVA AD-10, EVA AD-13, EVA AD-17, EVA AD-70, EVA AD-96 and EVA EL-851) (wherein all of the above represent brand names).

Examples of water-dispersible polyolefin resins include products manufactured by Unitika Ltd., such as the Arrowbase series (SB-1010, SE-1010, and DC1010 and the like), products manufactured by Toyobo Co., Ltd., such as the HARDLEN series (NZ1004, EW5250, and EH801J and the like), and products manufactured by BYK-Chemie GmbH, such as the AQUACER series (272, 497, 515, 531, and 537 and the like) (wherein all of the above represent brand names).

Various types of resins may be combined as the resin A and the resin B so that the difference between the glass transition temperatures of the resins is at least 80° C., and for example, suitable combinations may be used from among the resins listed above. It is preferable that at least one of the resin A and the resin B is a urethane-based resin or a (meth)acrylic-based resin. Further, it is preferable that the resin A and the resin B are both either a urethane-based resin or a (meth)acrylic-based resin. The resin A and the resin B may both be the same type of resin, or may be different types of resin. For example, it is preferable that either the resin A and the resin B are both urethane-type resins, or the resin A and the resin B are both (meth)acrylic-based resins.

In the aqueous adhesive liquid, the mass ratio between the resin A and the resin B is preferably within a range from 50:50 to 90:10, more preferably from 55:45 to 80:20, and even more preferably from 60:40 to 70:30. By increasing the amount of the resin A within these ranges, the fastness properties can be enhanced on transferred products that use a soft substrate typified by a fabric. On the other hand, by increasing the amount of the resin B within these ranges, the fastness properties can be enhanced on transferred products that use a hard substrate typified by plastics.

From the viewpoints of further enhancing the fastness properties of transferred products that use any of a variety of materials, and also improving the inkjet jetting characteristics, the amount of the resin A relative to the total mass of the aqueous adhesive liquid is preferably within a range from 1 to 20% by mass, more preferably from 5 to 15% by mass, and even more preferably from 8 to 10% by mass. From the viewpoints of further enhancing the fastness properties of transferred products that use any of a variety of materials, and also improving the inkjet jetting characteristics, the amount of the resin B relative to the total mass of the aqueous adhesive liquid is preferably within a range from 0.5 to 10% by mass, more preferably from 1 to 8% by mass, and even more preferably from 4 to 6% by mass.

The total amount of all of the resins contained in the aqueous adhesive liquid, relative to the total mass of the aqueous adhesive liquid, is preferably within a range from 1.5 to 30% by mass, more preferably from 5 to 20% by mass, and even more preferably from 10 to 15% by mass. Within these ranges, the inkjet jetting characteristics can be better enhanced, and the adhesion of the transfer sheet can also be further improved.

The aqueous adhesive liquid is preferably an aqueous composition containing water, and water may be the main solvent medium. There are no particular limitations on the water, but water containing as few ionic components as possible is preferred. For example, ion-exchanged water, distilled water, pure water, or ultrapure water or the like may be used as the water. From the viewpoints of viscosity adjustment and polarity adjustment, the amount of the water, relative to the total mass of the aqueous adhesive liquid, is preferably within a range from 20 to 90% by mass, more preferably from 40 to 80% by mass, and even more preferably from 50 to 70% by mass.

The aqueous adhesive liquid may also contain a water-soluble organic solvent, either in addition to the water, or instead of the water. From the viewpoints of the wetting characteristics and moisture retention properties, the water-soluble organic solvent is typically an organic compound that is liquid at room temperature (25° C.) and can be dissolved in, or is miscible with, water, and the use of a water-soluble organic solvent that can be mixed uniformly with an equal volume of water at one atmosphere and 20° C. is preferred.

Examples of the water-soluble organic solvent include lower alcohols such as methanol, ethanol, 1-propanol, isopropanol, 1-butanol, 2-butanol, isobutanol, and 2-methyl-2-propanol; glycols such as ethylene glycol, diethylene glycol, triethylene glycol, tetraethylene glycol, polyethylene glycol, propylene glycol, dipropylene glycol, tripropylene glycol, polypropylene glycol, and 1,2-butanediol; glycerols such as glycerol, diglycerol, triglycerol, and polyglycerol; acetins such as monoacetin and diacetin; glycol ethers such as ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol dimethyl ether, and tetraethylene glycol diethyl ether; as well as triethanolamine, 1-methyl-2-pyrrolidone, 1,3-dimethyl-2-imidazolidinone, β-thiodiglycol, and sulfolane. A single water-soluble organic solvent may be used alone, or a mixture of two or more solvents may be used, provided they form a single phase. The boiling point of the water-soluble organic solvent is preferably at least 100° C., and is more preferably 150° C. or higher.

From the viewpoints of the wetting characteristics, moisture retention effect, and viscosity adjustment, the amount of the water-soluble organic solvent relative to the total mass of the aqueous adhesive liquid may be within a range from 1 to 80% by mass, and is preferably from 5 to 50% by mass, and even more preferably from 10 to 20% by mass. In those cases where two or more water-soluble organic solvents are used, it is preferable that the combined amount of the two or more water-soluble organic solvents falls within these ranges. The total amount of the water-soluble organic solvent and the water, relative to the total mass of the aqueous adhesive liquid, is preferably within a range from 20 to 90% by mass, from 40 to 80% by mass, or from 60 to 75% by mass.

The aqueous adhesive liquid may also contain a surfactant. An anionic surfactant, cationic surfactant, amphoteric surfactant or nonionic surfactant may be used as the surfactant, but a nonionic surfactant is preferred. Further, either a low-molecular weight surfactant or a high-molecular weight surfactant may be used. The HLB value of the surfactant is preferably within a range from 5 to 20, and more preferably from 10 to 18.

Examples of nonionic surfactants include ester-based surfactants such as glycerol fatty acid esters and fatty acid sorbitan esters, ether-based surfactants such as polyoxyethylene alkyl ethers, polyoxyethylene alkylphenyl ethers and polyoxypropylene alkyl ethers, ether ester-based surfactants such as polyoxyethylene sorbitan fatty acid esters, acetylene-based surfactants, silicone-based surfactants, and fluorine-based surfactants. Among these, acetylene-based surfactants, silicone-based surfactants and fluorine-based surfactants can be used favorably, and acetylene-based surfactants are particularly desirable.

Examples of acetylene-based surfactants include acetylene glycol-based surfactants, acetylene alcohol-based surfactants, and other surfactants having an acetylene group. The acetylene glycol-based surfactants are glycols having an acetylene group, are preferably glycols having a left-right symmetrical structure with the acetylene group positioned in the middle, and may have a structure in which an ethylene oxide has been added to the acetylene glycol.

Examples of commercially available products of acetylene-based surfactants include products manufactured by Evonik Industries AG, such as the SURFYNOL series (such as SURFYNOL 104E, SURFYNOL 104H, SURFYNOL 420, SURFYNOL 440, SURFYNOL 465 and SURFYNOL485), and products manufactured by Nissin Chemical Industry Co., Ltd., such as the OLFINE series (such as OLFINE E1004, OLFINE E1010 and OLFINE E1020) (wherein all of the above represent brand names).

Examples of silicone-based surfactants include polyether-modified silicone-based surfactants, alkyl/aralkyl-comodified silicone-based surfactants and acrylic silicone-based surfactants. Examples of commercially available products of silicone-based surfactants include SILFACE SAG002 and SILFACE 503A and the like, manufactured by Nissin Chemical Industry Co., Ltd. (wherein all of the above represent brand names).

Further examples of other nonionic surfactants include polyoxyethylene alkyl ether-based surfactants manufactured by Kao Corporation, such as the EMULGEN series (such as EMULGEN 102KG, EMULGEN 103, EMULGEN 104P, EMULGEN 105, EMULGEN 106, EMULGEN 108, EMULGEN 120, EMULGEN 147, EMULGEN 150, EMULGEN 220, EMULGEN 350, EMULGEN 404, EMULGEN 420, EMULGEN 705, EMULGEN 707, EMULGEN 709, EMULGEN 1108, EMULGEN 4085 and EMULGEN 2025G) (wherein all of the above represent brand names).

Examples of anionic surfactants include products manufactured by Kao Corporation, including the EMAL series (such as EMAL 0, EMAL 10, EMAL 2F, EMAL 40 and EMAL 20C), the NEOPELEX series (such as NEOPELEX GS, NEOPELEX G-15, NEOPELEX G-25 and NEOPELEX G-65), the PELEX series (such as PELEX OT-P, PELEX TR, PELEX CS, PELEX TA, PELEX SS-L and PELEX SS-H), and the DEMOL series (such as DEMOL N, DEMOL NL, DEMOL RN and DEMOL MS) (wherein all of the above represent brand names).

Examples of cationic surfactants include products manufactured by Kao Corporation, including the ACETAMIN series (such as ACETAMIN 24 and ACETAMIN 86), the QUARTAMIN series (such as QUARTAMIN 24P, QUARTAMIN 86P, QUARTAMIN 60W and QUARTAMIN 86W), and the SANISOL series (such as SANISOL C and SANISOL B-50) (wherein all of the above represent brand names).

Examples of amphoteric surfactants include products manufactured by Kao Corporation, such as the AMPHITOL series (such as AMPHITOL 20BS, AMPHITOL 24B, AMPHITOL 86B, AMPHITOL 20YB and AMPHITOL 20N) (wherein all of the above represent brand names).

A single type of surfactant may be used alone, or a combination of two or more types may be used. The amount of the surfactant, relative to the total mass of the aqueous adhesive liquid, is preferably within a range from 0.1 to 5% by mass, and more preferably from 0.2 to 2% by mass.

In addition to the various components described above, the aqueous adhesive liquid may also optionally contain any of various additives such as corrosion inhibitors, preservatives, antioxidants, UV absorbers, infrared absorbers, crosslinking agents, pH adjusters, antifoaming agents, humectants (moisture retention agents), surface tension regulators (penetrants), and fixing agents, provided the inclusion of these additives does not impair the effects of the disclosure. The total amount of such additives relative to the total mass of the aqueous adhesive liquid is preferably not more than 10% by mass, more preferably not more than 5% by mass, and even more preferably 1% by mass or less.

In order to obtain jetting characteristics that are suitable for use with an inkjet method, the viscosity of the aqueous adhesive liquid at 23° C. is preferably within a range from 1 to 30 mPa·s, more preferably from 2 to 20 mPa·s, and even more preferably from 3 to 15 mPa·s. In this disclosure, the viscosity of the aqueous adhesive liquid refers to a numerical value measured at 23° C. using a rotational viscometer. For example, a Rheometer MCR302 manufactured by Anton Paar Japan K.K. may be used as the viscosity measurement apparatus.

The surface tension of the aqueous adhesive liquid at 23° C. is preferably within a range from 20 mN/m to 40 mN/m. In this disclosure, the surface tension of the aqueous adhesive liquid can be determined using the bubble pressure method (maximum bubble pressure method). For example, the surface tension can be measured using a SITA Messtechnik GmbH Science Line t60 manufactured by SITA Process Solutions GmbH.

There are no particular limitations on the method used for producing the aqueous adhesive liquid, and the desired aqueous adhesive liquid can be obtained by appropriately mixing the various components together. The resulting composition may also be filtered using a filter or the like. Further, various additional additives may also be added as appropriate.

[Aqueous Ink]

Next is a description of an aqueous ink that is prepared for use in the production method for the transfer sheet. The aqueous ink is an aqueous composition containing a colorant.

Pigments, dyes, or combinations thereof may be used as the colorant. In terms of the weather resistance and water resistance of the image in the state where an image has been formed on the transfer sheet, and the state where the image has been transferred to the transferred product, a pigment can be used particularly favorably.

The pigment is preferably blended into the ink in the form of a pigment dispersion. The pigment dispersion may be any dispersion in which the pigment can be dispersed within a solvent, enabling the pigment to exist within the ink in a dispersed state. For example, dispersions in which the pigment is dispersed in water using a pigment dispersant, dispersions in which a self-dispersing pigment is dispersed in water, and dispersions in which a microencapsulated pigment containing a pigment coated with a resin is dispersed in water may all be used.

Organic pigments such as azo pigments, phthalocyanine pigments, polycyclic pigments and dye lake pigments, and inorganic pigments such as carbon blacks and metal oxides may be used as the pigment. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. Any one of these pigments may be used alone, or a combination of two or more types of pigment may be used.

The average particle size of the pigment is preferably within a range from 10 to 500 nm, and more preferably from 10 to 200 nm. The average particle size of these pigments is preferably at least 10 nm from the viewpoint of color development, and preferably not more than 500 nm from the viewpoint of dispersion stability. In the case of an inkjet ink, from the viewpoint of the jetting characteristics, the average particle size is preferably not more than 500 nm. In this disclosure, the average particle size of the pigment refers to a volume-referenced average particle size, and is a numerical value measured by the dynamic light scattering method.

In order to stably disperse the pigment in the ink, a pigment dispersant typified by a polymer dispersant or surfactant is preferably used. Examples of commercially available products of polymer dispersants include the TEGO Dispers series (such as TEGO Dispers 740W, 750W, 755W and 760W) manufactured by Evonik Japan Co., Ltd., the Solsperse series (such as Solsperse 20000, 27000, 41000, 43000, 44000 and 46000) manufactured by The Lubrizol Corporation, the Joncryl series (such as Joncryl 57J, 60J and 63J) manufactured by BASF Japan Ltd., as well as DISPERBYK-102, 185, 190, 193 and 199, and BYKJET-9152 manufactured by BYK-Chemie Japan K.K. (wherein all of the above represent brand names).

In terms of the surfactant-type dispersants, considering the dispersion stability of the pigment in the ink, nonionic surfactants can be used favorably. Examples of commercially available products of surfactant-type dispersants include nonionic surfactants of the EMULGEN series (such as EMULGEN A-60, A-90, A-500 and 420) manufactured by Kao Corporation (wherein all of the above represent brand names).

A single type of pigment dispersant may be used alone, or a combination of two or more types may be used. When a pigment dispersant is used, there are no particular limitations on the amount of the pigment dispersant, which varies depending on the type of pigment dispersant used. For example, the amount of the pigment dispersant, expressed as a mass ratio of the active component relative to a value of 1 for the pigment, is preferably within a range from 0.005 to 2.0, more preferably from 0.01 to 1.0, and even more preferably from 0.1 to 0.5.

A self-dispersing pigment may be used as the pigment. A self-dispersing pigment is a pigment in which a hydrophilic functional group has been introduced at the pigment surface by a chemical treatment or a physical treatment. The hydrophilic functional group introduced into the self-dispersing pigment is preferably a group that has ionicity, and by charging the pigment surface either anionically or cationically, the pigment particles can be stably dispersed in water by electrostatic repulsion. Preferred anionic functional groups include a carboxyl group, sulfo group, or phosphate group or the like. Preferred cationic functional groups include quaternary ammonium groups and quaternary phosphonium groups and the like.

These hydrophilic functional groups may be bonded directly to the pigment surface, or may be bonded via another atom grouping. Examples of this other atom grouping include, but are not limited to, alkylene groups, phenylene groups and naphthylene groups. Examples of methods for treating the pigment surface include diazotization treatments, sulfonation treatments, hypochlorous acid treatments, humic acid treatments, and vacuum plasma treatments.

Examples of products that can be used favorably as self-dispersing pigments include the CAB-O-JET series (such as CAB-O-JET 200, CAB-O-JET 300, CAB-O-JET 250C, CAB-O-JET 260M, CAB-O-JET 270, and CAB-O-JET 450C and the like) manufactured by Cabot Corporation, and BONJET BLACK CW-1, BONJET BLACK CW-2, BONJET BLACK CW-3, and BONJET BLACK CW-4 and the like manufactured by Orient Chemical Industries, Ltd. (wherein all of the above represent brand names).

Pigment dispersions containing a pigment that has already been dispersed using a pigment dispersant may also be used. Examples of commercially available products of pigment dispersions that have been dispersed using a pigment dispersant include the HOSTAJET series manufactured by Clariant AG, and the FUJI SP series manufactured by Fuji Pigment Co., Ltd. (wherein both of the above represent brand names). Microencapsulated pigments in which the pigment has been coated with a resin may also be used as the pigment.

Dyes may also be added as the colorant. There are no particular limitations on the dye, and any dye typically used in the technical filed of printing may be used. Specific examples include basic dyes, acid dyes, direct dyes, soluble vat dyes, acid mordant dyes, mordant dyes, reactive dyes, vat dyes and sulfide dyes. Among these, water-soluble dyes and dyes that can be made water-soluble by reduction or the like can be used favorably. More specific examples include azo dyes, rhodamine dyes, methine dyes, azomethine dyes, xanthene dyes, quinone dyes, triphenylmethane dyes, diphenylmethane dyes, and methylene blue and the like.

A single type of colorant may be used alone, or a combination of two or more types may be used. The amount of the colorant, relative to the total mass of the ink, is preferably within a range from 0.1 to 20% by mass, more preferably from 1 to 10% by mass, and even more preferably from 2 to 5% by mass. In those cases where a white pigment is used in an aqueous ink to form a base color layer, in order to enhance the concealment of the transfer target object in the transferred product, the amount of the white pigment relative to the total mass of the ink is preferably within a range from 1 to 30% by mass, more preferably from 5 to 20% by mass, and even more preferably from 10 to 15% by mass.

The aqueous ink may also contain a surfactant. The surfactant can further improve the penetration or wetting characteristics of the ink on the releasable support, and further improve the coating characteristics of the ink.

Nonionic surfactants, anionic surfactants, cationic surfactants, amphoteric surfactants, or combinations of these surfactants can be used favorably as the surfactant, but including a nonionic surfactant is particularly preferred. Either one surfactant, or a combination of two or more surfactants, selected from among those surfactants described above for the aqueous adhesive liquid may be used. The amount of the surfactant, expressed as an amount of the active component, relative to the total mass of the aqueous ink, is preferably within a range from 0.1 to 5% by mass, and more preferably from 0.2 to 2% by mass.

The aqueous ink may also contain a binder resin. Examples of the binder resin include water-dispersible resins, water-soluble resins, and combinations thereof. By using an aqueous ink containing a binder resin, a resin coating film is formed on the releasable support, and the fixability of the image and the coating film strength can be further improved. In those cases where a transfer sheet having this type of image formed thereon is used, even in the state following transfer of the image to the transfer target object, the fixability of the image and the coating film strength on the transferred product can be further enhanced, and the fastness properties can be further improved.

Examples of the water-dispersible resins include conjugated diene-based resins such as styrene-butadiene copolymers, methyl methacrylate-butadiene copolymers, and vinyl chloride-vinyl acetate copolymers; (meth)acrylic-based resins; vinyl-based resins such as ethylene-vinyl acetate copolymers, or functional group-modified resins in which a carboxyl group or the like of any of these resins has been modified with a functional group-containing monomer; as well as urethane-based resins, melamine resins, urea resins, polyester resins, polyolefin resins, silicone resins, polyvinyl butyral resins, and alkyd resins. By either introducing a hydrophilic functional group into these resins, or performing a surface treatment with a dispersant or the like, an oil-in-water resin emulsion can be formed, and this emulsion may be added to the aqueous adhesive liquid. From the viewpoint of the inkjet jetting characteristics, the average particle size of the water-dispersible resin is typically within a range from 10 to 300 nm, and preferably from 50 to 150 nm. Further, the average particle size of the resin particles in a resin emulsion added to the aqueous ink preferably also satisfies these ranges.

Examples of the water-soluble resins include polyvinyl alcohol, poly(meth)acrylic acid, neutralized products of poly (meth)acrylic acid, (meth)acrylic acid/maleic acid copolymers, (meth)acrylic acid/sulfonic acid copolymers, and styrene/maleic acid copolymers.

The amount of the binder resin, relative to the total mass of the aqueous ink, is preferably within a range from 1 to 20% by mass, and more preferably from 5 to 10% by mass. In those cases where a white pigment is used in an aqueous ink to form a base color layer, in order to enhance the concealment of the transfer target object in the transferred product, the amount of the white pigment is preferably increased, and in such cases, the amount of the binder resin is preferably also increased in accordance with the amount of the white pigment. From this viewpoint, in the case of an aqueous ink containing a white pigment, the amount of the binder resin relative to the total mass of the aqueous ink is preferably within a range from 1 to 30% by mass, more preferably from 5 to 20% by mass, and even more preferably from 10 to 15% by mass.

The aqueous ink preferably contains water, and water may be the main solvent medium. Details regarding the water are as described above in relation to the aqueous adhesive liquid. From the viewpoint of viscosity adjustment, the amount of the water, relative to the total mass of the ink, is preferably within a range from 20 to 90% by mass, more preferably from 30 to 80% by mass, and even more preferably from 40 to 80% by mass.

The aqueous ink may also contain a water-soluble organic solvent, either in addition to the water, or instead of the water. For the water-soluble organic solvent, either a single solvent or a combination of two or more solvents selected from among those solvents described above in relation to the aqueous adhesive liquid may be used. From the viewpoints of the wetting characteristics, moisture retention properties, and viscosity adjustment and the like, the amount of the water-soluble organic solvent, relative to the total mass of the aqueous ink, is preferably within a range from 1 to 80% by mass, more preferably from 10 to 50% by mass, and even more preferably from 20 to 40% by mass. The total amount of the water-soluble organic solvent and the water, relative to the total mass of the aqueous ink, is preferably within a range from 50 to 98% by mass, from 60 to 95% by mass, or from 70 to 95% by mass.

In addition to the various components described above, the aqueous ink may also optionally contain any of various additives such as corrosion inhibitors, preservatives, antioxidants, UV absorbers, infrared absorbers, crosslinking agents, pH adjusters, antifoaming agents, humectants (moisture retention agents), surface tension regulators (penetrants), and fixing gents. The total amount of such additives relative to the total mass of the aqueous ink is preferably not more than 10% by mass, more preferably not more than 5% by mass, and even more preferably 1% by mass or less.

In order to obtain jetting characteristics that are suitable for an inkjet ink, the viscosity of the aqueous ink at 23° C. is preferably within a range from 1 to 40 mPa·s, more preferably from 4 to 20 mPa·s, and even more preferably from 3 to 15 mPa·s. The viscosity of the aqueous ink can be measured in accordance with the method described above for measuring the viscosity of the aqueous adhesive liquid.

The surface tension of the aqueous ink at 23° C. is preferably within a range from 20 to 40 mN/m. The surface tension of the aqueous ink can be measured in accordance with the method described above for measuring the surface tension of the aqueous adhesive liquid.

There are no particular limitations on the method used for producing the aqueous ink, and the desired ink can be obtained by appropriately mixing the various components together. For example, in order to improve the dispersion of the pigment, a dispersion device such as a beads mill may be used. The resulting composition may also be filtered using a filter or the like. Further, various additional additives may also be added as appropriate.

[Releasable Support]

Next is a description of the releasable support used in the method for producing the transfer sheet. The releasable support is a support which, following formation of a laminate containing the image layer and the adhesive layer on the surface of the support, can adopt a state in which the laminate is able to be detached from the releasable support. The releasable support has a surface that functions as a releasable surface, and for example, has a structure in which the surface has an uneven shape, or a structure in which the surface exhibits releasability, or a combination thereof.

One form of the releasable support includes a substrate and a protective layer formed on the substrate in a releasable manner. There are no particular limitations on the substrate, provided it is releasable from the protective layer, and opaque, semi-transparent or transparent substrates may be used. Further, the substrate may be a rigid substrate or a flexible substrate, but a flexible substrate is preferred in terms of being able to conform to the surface shape of the transfer target object. Releasable substrates such as release-treated papers and release-treated plastic films and the like can be used favorably as the substrate. There are no particular limitations on the plastic film, but in terms of the mechanical strength, heat resistance, and workability and the like, a polyester or the like is preferred, and a polyethylene terephthalate is particularly desirable. The releasability can be imparted by conventional methods, for example, by treating the substrate with a release agent. Examples of the release agent include waxes, higher fatty acid salts, fatty acid esters, higher fatty acid amides, silicone oils, and silicone resins. The protective layer may be formed from any of various thermoplastic resins, thermosetting resins or elastomers or the like, provided the layer can be detached from the substrate, protects the image that has been transferred to the transferred product, and does not significantly impair the image quality.

Another form of the releasable support includes a substrate, a protective layer formed on the substrate in a releasable manner, and an ink-receiving layer formed on the protective layer. The ink-receiving layer can use any material capable of absorbing and retaining ink, and may be formed from inorganic particles, a cationic polymer, a hydrophilic polymer, thermoplastic resin particles, thermosetting resin particles, or an elastomer or the like.

Examples of commercially available products for the releasable support include transfer films procurable from Eastman Kodak Company (USA), McLaud Technology (USA), and Ecofreen Co., Ltd. (Republic of Korea) and the like.

[Method for Producing Transfer Sheet]

A method for producing the transfer sheet using the aqueous ink and the aqueous adhesive liquid is described below.

First is a description of forming an image by jetting the aqueous ink onto the releasable support using an inkjet method.

The inkjet method is a printing method that enables image formation on-demand in a simple and free manner without any contact with the substrate. There are no particular limitations on the inkjet method, and any one of a piezo method, electrostatic method, or thermal method or the like may be used. When an inkjet printing device is used, it is preferable that the aqueous ink is jetted from the inkjet head based on a digital signal, with the jetted droplets of the aqueous ink adhering to the substrate.

The aqueous ink may be a single-color ink, or may be composed of inks of multiple colors. In the case of multiple colors, the plurality of inks are adhered sequentially to the releasable support to form a color image, with the aqueous adhesive liquid then being applied thereafter. In the case of multiple inks, each of the plurality of inks is preferably an aqueous ink.

From the viewpoint of achieving favorable concealment of the surface of the transfer target object, following formation of an image on the releasable support using the aqueous ink, an ink of a color tone having superior concealment properties, such as a white pigment ink, is preferably used to form a base color layer on top of the image. In those cases where a base color layer is to be formed, the image is first formed on the releasable support, the base color layer is then formed on top of the image, and the aqueous adhesive liquid is subsequently applied. It is preferable that the inks used for forming the image and the base color layer are all aqueous inks.

Next is a description of jetting the aqueous adhesive liquid by an inkjet method so as to at least partially overlap the image.

There are no particular limitations on the inkjet method, which may be as described above in relation to the aqueous ink. The aqueous ink and the aqueous adhesive liquid may be printed in an in-line manner using the same inkjet printing device, or may be printed using separate inkjet printing devices.

On the releasable support on which the image has been formed, the aqueous adhesive liquid is applied so as to at least partially overlap the region on which the image has been formed. In order to enable selective transfer of the image from the transfer sheet to the transfer target object, the aqueous adhesive liquid is preferably applied so as to overlap the shape of the image. In other words, on the releasable support, it is preferable that the aqueous adhesive liquid is applied to the region in which the image has been formed, but not applied to the region in which the image has not been formed. As a result, in the state following transfer to the transfer target object, because the image layer is formed on top of the region in which the adhesive layer is formed, exposure of the adhesive layer on the surface of the transferred product is prevented, and stickiness caused by the adhesive layer can be better prevented. It should be noted that the invention does not exclude those cases in which a small amount of the aqueous adhesive liquid is applied outside the image region around the outline of the image.

The aqueous adhesive liquid may be applied once to the releasable support on which the image has been formed, or may be applied two or more times. Even when the aqueous adhesive liquid is applied once, forming a single adhesive layer on the releasable support bearing the image, satisfactory transferability and fastness properties can be achieved. In those cases where the aqueous adhesive liquid is applied two or more times, the aqueous adhesive liquids applied may be the same or different, but it is preferable that the aqueous adhesive liquid for at least one application contains the resin A and the resin B.

Following application of the aqueous ink and the aqueous adhesive liquid to the releasable support, a further treatment for removing moisture from the releasable support may also be provided. For example, the releasable support may be dried by conducting a heat treatment, an air blowing method, or a moisture removal treatment or the like. The heat treatment is preferably conducted so as to have no effect on the adhesion of the aqueous adhesive liquid, and for example, is preferably conducted at a temperature within a range from 40° C. to 140° C. for a period of one minute to one hour.

In the period following application of the aqueous ink to the releasable support, through until prior to the application of the aqueous adhesive liquid, a further treatment for removing moisture from the releasable support bearing the aqueous ink may also be provided. This suppresses spreading of the dots of the aqueous ink, enabling better prevention of bleeding of the image. From the viewpoint of causing mixing of the aqueous ink and the aqueous adhesive liquid on top of the releasable support, thereby enhancing the adhesion of the image to the transfer target object, a drying step is preferably not provided between application of the aqueous ink and the aqueous adhesive liquid to the releasable support. In other words, the aqueous adhesive liquid may be applied in a wet-on-wet manner to the releasable support bearing the aqueous ink.

[Aqueous Adhesive Liquid and Production Kit for Transfer Sheet]

The aqueous adhesive liquid for a transfer sheet according to one embodiment is an aqueous adhesive liquid used in a method for producing a transfer sheet that includes forming an image by jetting an aqueous ink by an inkjet method onto a releasable support, and then applying the aqueous adhesive liquid by an inkjet method so as to at least partially overlap the image, wherein the aqueous adhesive liquid contains a resin A, and a resin B having a glass transition temperature that is at least 80° C. higher than that of the resin A. Details regarding the aqueous adhesive liquid are as described above.

According to one embodiment, a combination of the aqueous ink and the aqueous adhesive liquid according to embodiments described above can be provided as a production kit for a transfer sheet. In another embodiment, a combination of the aqueous ink, the aqueous adhesive liquid and the releasable support according to embodiments described above can be provided as a production kit for a transfer sheet.

[Transfer Sheet]

The transfer sheet according to one embodiment includes a releasable support, and a laminate that is formed on top of the releasable support and includes an image layer and an adhesive layer, wherein the adhesive layer contains a resin A, and a resin B having a glass transition temperature that is at least 80° C. higher than that of the resin A. This transfer sheet can be obtained in accordance with the production method described above, using the aqueous ink, the aqueous adhesive liquid and the releasable support according to embodiments described above.

By ensuring that the adhesive layer contains the resin A, and the resin B having a glass transition temperature that is at least 80° C. higher than that of the resin A, the transferability of the laminate of the image layer and the adhesive layer from the transfer sheet to the transfer target object can be improved, and the fastness properties of the transferred product to which this laminate has been transferred can also be improved. In the transfer sheet, the laminate may be composed of a distinguishable image layer and adhesive layer, may be a laminate in which the image layer and adhesive layer have undergone mixing on the releasable support so that the various components exist in a gradient, or may be a laminate in which the image layer and adhesive layer have undergone mixing and exist in a state in which components have mutually dispersed into the other layer.

Details regarding the releasable support are as described above, and for example, the releasable support may include a substrate, and a protective layer formed on top of the substrate, with the laminate then formed on top of the protective layer. Moreover, an ink-receiving layer may also be formed on the surface of the releasable support on which the image has been formed.

[Method for Producing Transferred Product]

The transferred product according to one embodiment includes a transfer target object, and an image that has been transferred to the transfer target object from a transfer sheet. This transferred product can be obtained using the transfer sheet according to an embodiment described above.

The transferred product obtained using the transfer sheet according to one embodiment is a product to which a laminate including an image layer and an adhesive layer has been transferred from the transfer sheet, and the adhesive layer is preferably a layer of an aforementioned embodiment containing the resin A and the resin B. As a result, the fastness properties of the image transferred to the transferred product can be improved.

A method for producing the transferred product is described below. There are no particular limitations on the method used for producing the transferred product, and typical methods may be used. For example, by attaching the transfer sheet to the surface of the transfer target object, and conducting a heat treatment if necessary, thereby detaching the releasable support from the transfer sheet, a transferred product can be obtained in which the image has been transferred from the transfer sheet to the surface of the transfer target object.

Examples of the transfer target object include metal substrates such as aluminum, iron, copper, titanium, tin, chromium, cadmium, and alloys (such as stainless steel, and steel and the like); glass substrates such as borosilicate glass, quartz glass, and soda lime glass; resin substrates such as polyethylene terephthalate (PET), polypropylene (PP), polyethylene (PE), (meth)acrylic-based resins, and vinyl chloride-based resins; and ceramic substrates such as alumina, zirconia, steatite, silicon nitride, and pottery. There are no particular limitations on the shape of these substrates, which may be film-like, sheet-like, plate-like, or molded articles or structural objects. These substrates may also have a plating layer, metal oxide layer, or resin layer or the like formed thereon, or may have been subjected to a surface treatment using a corona treatment or the like.

Further examples of the transfer target object include printing papers such as plain papers, coated papers and specialty papers; fabrics such as woven fabrics, knitted fabrics and nonwoven fabrics, or fabric products thereof; porous building materials for humidity control, sound absorption or thermal insulation; as well as wood, concrete and porous materials. Here, plain papers refers to typical papers having no ink-receiving layer or film layer or the like formed thereon. Examples of plain papers include high-quality papers, medium-quality papers, PPC papers, woody papers, and recycled papers. Further, examples of coated papers that can be used favorably include inkjet coated papers such as matte papers, glossy papers, and semi-glossy papers, or so-called coated printing papers.

Examples of the fibers that constitute the fabric include at least one type of fiber selected from among fibers including inorganic fibers such as metal fiber, glass fiber, rock wool fiber and slag fiber; recycled fibers such as cellulose-based or protein-based fiber; semi-synthetic fibers such as cellulose-based fiber; synthetic fibers such as fibers of polyamide, polyester, polyvinyl chloride, polyvinylidene chloride, polyacrylonitrile, polyvinyl alcohol, polyurethane, polyethylene, polypropylene, polystyrene, and polyethylene fluoride; and natural fibers such as cotton, linen, silk and wool.

The transfer target object may be a soft substrate or a hard substrate. By using the transfer sheet according to one embodiment, a transferred product having favorable image transferability and fastness properties can be obtained for a soft substrate having elasticity such as a fabric. Further, by using the transfer sheet according to one embodiment, a transferred product having favorable image transferability and fastness properties can also be obtained for a hard substrate such as a plastic.

The transfer temperature is preferably within a range from 50 to 200° C. The heating device used in the transfer is preferably a heating device that employs a method in which pressure is applied at the same time as the thermal energy, such as a heated roller device or heat press device.

EXAMPLES

The present invention is described below in further detail using a series of examples. However, the present invention is not limited to the following examples. In the following description, unless stated otherwise, "%" refers to "% by mass".

[Production of Aqueous Inks]

Aqueous ink formulations are shown in Table 1. Using each of the formulations shown in Table 1, the pigment, dispersant and 20 g of water were placed in a polypropylene (PP) bottle, and a dispersion was obtained by dispersing the components using a rocking mill RM-05 (manufactured by Seiwa Technical Lab Co., Ltd.) as a stirring and dispersion device. The conditions for the rocking mill included 00.5 mm zirconia beads, 60 Hz, and a period of three hours. Following filtering of the beads using a #120 mesh, the resin, water-soluble solvent, surfactant, and remaining water were added, and the resulting mixture was stirred at 100 rpm for 20 minutes using a mix rotor and then filtered through a 3 μm filter to obtain an aqueous ink. The amount of each component shown in the table indicates the amount of the active component.

[Production of Aqueous Adhesive Liquids]

Aqueous adhesive liquid formulations are shown in Table 2. In each case, the raw materials were mixed together in accordance with the formulation shown in the table, subsequently stirred at 100 rpm for 20 minutes using a mix rotor, and then filtered through a 3 μm filter to obtain an aqueous adhesive liquid. The amount of each component shown in the table indicates the amount of the active component.

[Method for Measuring Resin Glass Transition Temperature]

The glass transition temperature (Tg) of each resin was measured by differential scanning calorimetry (DSC). Specifically, a thermoanalyzer manufactured by Rigaku Corporation (Thermoplus EVO2 DSC8231) was used for the differential scanning calorimetry measurements. In terms of measurement conditions, the measurement sample was first prepared by heating the sample from room temperature to 200° C. at a rate of temperature increase of 10° C./minute, and then cooling the sample from 200° C. to −50° C. at a rate of temperature decrease of 10° C./minute. Subsequently, the prepared measurement sample was heated at a rate of temperature increase of 10° C./minute, and the glass transition temperature was defined as the temperature at the intersection between the extension of the baseline at temperatures below the endothermic maximum peak temperature, and the tangent that represents the maximum slope between the start of the rise in peak temperature and the peak apex.

Further, in the case of resins for which measurement of the glass transition temperature by differential scanning calorimetry (DSC) was difficult, the glass transition temperature measured by dynamic viscoelasticity measurement was used. Specifically, a dynamic viscoelasticity measurement apparatus (Rheogel-E4000) manufactured by UBM Co., Ltd. was used for the dynamic viscoelasticity measurement. Measurement conditions included a frequency of 10 Hz and a rate of temperature increase of 2° C./minute, and the glass transition temperature was defined as the temperature at the point where the loss modulus (E") in the dynamic viscoelasticity reached a maximum.

The components used were as follows.

Color pigment: carbon black "MOGUL L" (brand name), manufactured by Cabot Corporation Color pigment: cyan pigment "Blue No. 4", manufactured by Dainichiseika Color & Chemicals Mfg. Co., Ltd.

White pigment: titanium oxide "CR-80" (brand name), manufactured by Ishihara Sangyo Kaisha, Ltd.

Dispersant: DISPERBYK-190 (brand name): amount of active component 40%, manufactured by BYK-Chemie Japan K.K.

Water-soluble solvent: glycerol, b.p.=290° C.

Water-soluble solvent: propylene glycol, b.p.=188° C.

Surfactant: acetylene glycol-based surfactant "SURFYNOL 485" (brand name), amount of active component 100%, manufactured by Nissin Chemical Industry Co., Ltd.

Other components used were as follows.

(Resins)

Urethane-based resin (SUPERFLEX 460) (brand name), manufactured by DKS Co., Ltd.

Acrylic-based resin (Mowinyl 702) (brand name), manufactured by Japan Coating Resin Corporation Urethane-based resin (SUPERFLEX 420) (brand name), manufactured by DKS Co., Ltd.

Ethylene-vinyl acetate copolymer (Polysol EVA AD-18) (brand name), manufactured by Showa Denko K.K.

Styrene acrylic-based resin (NeoCryl A-1120) (brand name), manufactured by Kusumoto Chemicals, Ltd.

Acrylic-based resin (Mowinyl 727) (brand name), manufactured by Japan Coating Resin Corporation Styrene acrylic-based resin (Mowinyl 1760) (brand name), manufactured by Japan Coating Resin Corporation Urethane-based resin (SUPERFLEX 870) (brand name), manufactured by DKS Co., Ltd.

Urethane-based resin (TAKELAC W-6020) (brand name), manufactured by Mitsui Chemicals Inc.

Urethane acrylic-based resin (DAOTAN TW 6462) (brand name), manufactured by Daicel-Allnex Ltd.

Acrylic-based resin (NeoCryl A-1105) (brand name), manufactured by Kusumoto Chemicals, Ltd.

Urethane-based resin (TAKELAC W-605) (brand name), manufactured by Mitsui Chemicals Inc.

Urethane-based resin (TAKELAC WS-4022) (brand name), manufactured by Mitsui Chemicals Inc.

Acrylic-based resin (NeoCryl XK-52) (brand name), manufactured by Kusumoto Chemicals, Ltd.

Styrene acrylic-based resin (Mowinyl 972) (brand name), manufactured by Japan Coating Resin Corporation The obtained aqueous inks and aqueous adhesive liquids were used in the combinations shown in Table 3 to produce transfer sheets in accordance with the following procedure. Using the combinations shown in Table 3, the aqueous ink and the aqueous adhesive liquid were placed in a flatbed printer MMP8130 manufactured by Mastermind Inc. The aqueous ink was jetted so as to print an image pattern onto a transfer film (DTF Kodak Transfer Film A3+13"×19" COLD Peel, manufactured by Eastman Kodak Company), and the aqueous adhesive liquid was then jetted on top of the image pattern. The image patterns for the aqueous ink and the aqueous adhesive liquid were of the same shape, and were printed onto the same locations on the transfer film, so that the coated regions for the aqueous ink and the aqueous adhesive liquid overlapped. The resulting printed item was subjected to a heat treatment in an oven at 140° C. for 10 minutes.

The dried transfer sheet was cut and overlaid on top of the transfer target object, and a heat treatment was then conducted at 160° C. for 30 seconds using a heat press device, thereby transferring the image pattern to the transfer target object and detaching the releasable support of the transfer film to obtain a transferred product. For the transfer target object, a cotton fabric (as prescribed in JIS L 0803, standard adjacent fabric for testing, cotton (cannequin No. 3)) and a polycarbonate sheet (CARBOGLASS C110C, manufactured by AGC Inc.) were used.

In Example 12, with the exception of jetting the aqueous ink No. 1, the aqueous ink No. 3, and the aqueous adhesive liquid No. 4 in that order, and then subjecting the resulting printed item to a heat treatment in the oven, a transferred product was prepared in the same manner as that described above.

[Transferability]

The transferability of the image from the transfer sheet to each of the transfer target objects was evaluated against the following criteria. The printed text was full-width hiragana in the MS gothic font.

A: text of 5 points or smaller was able to be completely transferred

B: transfer of text of 5 points or smaller was incomplete. Text of 6 points was able to be completely transferred C: transfer of text of 6 points was incomplete

[Fastness Properties]

For each transferred product bearing the image transferred from the transfer sheet, the dry rubbing fastness properties were evaluated against the following criteria. The dry rubbing fastness properties were evaluated in accordance with the dry test prescribed in JIS L 0849, with the test conducted using a type I tester, and evaluation performed using a staining grey scale.

A: grade 4 or higher
B: grade 3 to grade 3-4
C: grade 2 to grade 2-3
D: grade 1-2 or lower

TABLE 1

Aqueous ink formulations

| Units: % by mass | | Ink No. 1 | 2 | 3 | 4 |
|---|---|---|---|---|---|
| Color pigment | Carbon black (MOGULL) | 3.5 | — | — | 3.5 |
| Color pigment | Cyan pigment (Blue No. 4) | — | 3.5 | — | — |
| White pigment | Titanium oxide (CR-80) | — | — | 10 | — |
| Dispersant *amount of active component | Water-based dispersant (DISPERBYK-190) | 0.7 | 0.7 | 2 | 0.7 |

TABLE 1-continued

Aqueous ink formulations

| Units: % by mass | | Ink No. 1 | 2 | 3 | 4 |
|---|---|---|---|---|---|
| Resin *amount of active component | Urethane-based resin (SUPERFLEX 460) | 7 | 7 | 20 | — |
| Water-soluble solvents | Glycerol | 5 | 5 | 5 | 5 |
| | Propylene glycol | 10 | 10 | 10 | 10 |
| Surfactant | Acetylene glycol-based surfactant (SURFYNOL 485) | 1 | 1 | 1 | 1 |
| Water | Purified water | 72.8 | 72.8 | 52 | 79.8 |
| Total (% by mass) | | 100 | 100 | 100 | 100 |

TABLE 2

Aqueous adhesive liquid formulations

| Units: % by mass | | Tg (° C.) | Aqueous adhesive liquid No. 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| Resins* amount of active component | Urethane-based resin (SUPERFLEX 460) | −21 | 10 | 7.5 | 12 | — | — | — | — | — | 10 | — | — | 10 | — | 15 | — |
| | Acrylic-based resin (Mowinyl 702) | −19 | — | — | — | — | 10 | — | — | — | — | — | — | — | — | — | — |
| | Urethane-based resin (SUPERFLEX 420) | −10 | — | — | — | 10 | — | — | — | — | — | — | — | — | — | — | — |
| | Ethylene-vinyl acetate copolymer (POLYSOL EVA AD-18) | −10 | — | — | — | — | — | — | — | — | — | — | 10 | — | — | — | — |
| | Styrene acrylic-based resin (NeoCryl A-1120) | −9 | — | — | — | — | — | 10 | — | — | — | — | — | — | — | — | — |
| | Acrylic-based resin (Mowinyl 727) | 5 | — | — | — | — | — | — | 10 | — | — | 10 | — | — | — | — | — |
| | Styrene acrylic-based resin (Mowinyl 1760) | 7 | — | — | — | — | — | — | — | 10 | — | — | — | — | — | — | 10 |
| | Urethane-based resin (SUPERFLEX 870) | 78 | — | — | — | — | — | — | — | — | — | — | — | — | 15 | — | 5 |
| | Urethane-based resin (TAKELAC W-6020) | 90 | — | — | — | — | — | — | 5 | — | 5 | — | — | — | — | — | — |
| | Urethane acrylic-based resin (DAOTAN TW 6462) | 90 | — | — | — | — | — | — | — | — | — | — | — | 5 | — | — | — |
| | Acrylic-based resin (NeoCryl A-1105) | 93 | — | — | — | — | — | — | — | 5 | — | — | — | — | — | — | — |
| | Urethane-based resin (TAKELAC W-605) | 100 | 5 | 7.5 | 3 | — | — | — | — | — | — | 5 | — | — | — | — | — |
| | Urethane-based resin (TAKELAC WS-4022) | 115 | — | — | — | 5 | — | — | — | — | — | — | 5 | — | — | — | — |
| | Acrylic-based resin (NeoCryl XK-52) | 108 | — | — | — | — | 5 | — | — | — | — | — | — | — | — | — | — |
| | Styrene acrylic-based (Mowinyl 972) | 101 | — | — | — | — | — | 5 | — | — | — | — | — | — | — | — | — |
| Water-soluble solvents | Glycerol | | 5 | 5 | 5 | 5 | 5 | 5 | 5 | 5 | 5 | 5 | 5 | 5 | 5 | 5 | 5 |
| | Propylene glycol | | 10 | 10 | 10 | 10 | 10 | 10 | 10 | 10 | 10 | 10 | 10 | 10 | 10 | 10 | 10 |
| Surfactant | Acetylene glycol-based surfactant (SURFYNOL 485) | | 1 | 1 | 1 | 1 | 1 | 1 | 1 | 1 | 1 | 1 | 1 | 1 | 1 | 1 | 1 |
| Water | Purified water | | 69 | 69 | 69 | 69 | 69 | 69 | 69 | 69 | 69 | 69 | 69 | 69 | 69 | 69 | 69 |
| Total (% by mass) | | | 100 | 100 | 100 | 100 | 90 | 100 | 100 | 100 | 100 | 100 | 100 | 100 | 100 | 100 | 100 |

TABLE 3

Combinations of aqueous inks and aqueous adhesive liquids, and evaluation results

| | | Example 1 | 2 | 3 | 4 | 5 | 6 | 7 | 8 | 9 | 10 | 11 | 12 | 13 | 14 | 15 | Comparative Example 1 | 2 | 3 |
|---|---|---|---|---|---|---|---|---|---|---|---|---|---|---|---|---|---|---|---|
| Combination | Ink No. | 1 | 1 | 1 | 2 | 1 | 1 | 1 | 1 | 1 | 1 | 3 | 1 3 | 2 | 1 | 4 | 1 | 1 | 1 |
| | Aqueous adhesive liquid No. | 1 | 2 | 3 | 4 | 5 | 6 | 7 | 8 | 9 | 10 | 1 | 4 | 11 | 12 | 1 | 13 | 14 | 15 |
| Transferability | Soft substrate: cotton fabric | A | A | A | A | A | A | B | B | A | A | A | A | A | A | A | A | A | B |

TABLE 3-continued

Combinations of aqueous inks and aqueous adhesive liquids, and evaluation results

| | | Example | | | | | | | | | | | | | | | Comparative Example | | |
|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 1 | 2 | 3 |
| Fastness properties | Hard substrate: polycarbonate sheet | A | A | A | A | A | B | A | A | A | A | A | A | A | A | A | B | A | A |
| | Soft substrate: cotton fabric | A | B | A | A | B | A | B | B | A | B | A | A | B | A | B | D | B | C |
| | Hard substrate: polycarbonate sheet | A | A | B | A | A | A | B | B | B | A | A | A | B | B | B | C | D | C |

As shown in the tables, with the combinations of an aqueous ink and an aqueous adhesive liquid from each of the examples, excellent results were obtained for the fastness properties on each of the substrates. Moreover, excellent results were also obtained for the transferability to each of the substrates.

Examples 1 to 15 represent examples that use combinations of various resins with the aqueous adhesive liquid, and all of these examples yielded favorable results. In Examples 1 to 6 and 9 to 12, either the Tg value for the resin A in the aqueous adhesive liquid was less than 0° C., or the Tg value for the resin B exceeded 95° C., and the results were particularly favorable. In Examples 1 to 6 and 11, the Tg value for the resin A in the aqueous adhesive liquid was less than 0° C., and the Tg value for the resin B exceeded 95° C., and the results were even more favorable. Based on the results of Examples 1 to 3, it was evident that when the ratio in the aqueous adhesive liquid of the amount of the resin A having a low Tg value relative to the amount of the resin B having a high Tg value was large, the fastness properties on soft substrates tended to improve more, whereas when this ratio was small, the fastness properties on hard substrates tended to improve more.

Favorable results were also achieved in the white ink printing of Example 11, the black ink and white ink overprinting of Example 12, and the cyan ink printing of Example 13. Favorable results were also obtained in Example 15 which used an aqueous ink containing no resin.

Comparative Examples 1 to 3 represent examples in which either the aqueous adhesive liquid contained only one type of resin, or in which the difference in the Tg values of the two resins contained in the aqueous adhesive liquid was small, and in each case, a deterioration in the fastness properties was observed.

It is to be noted that, besides those already mentioned above, many modifications and variations of the above embodiments may be made without departing from the novel and advantageous features of the present invention. Accordingly, all such modifications and variations are intended to be included within the scope of the appended claims.

DESCRIPTION OF THE REFERENCE SIGNS

1: Releasable support, 1*a*: Substrate, 1*b*: Protective layer, 2: Image layer, 3: Adhesive layer, 4: Transfer target object

What is claimed is:

1. A method for producing a transfer sheet, comprising:

forming an image by jetting an aqueous ink by an inkjet method onto a releasable support; and jetting an aqueous adhesive liquid by an inkjet method so that the aqueous adhesive liquid at least partially overlaps the image, wherein the aqueous adhesive liquid comprises a resin A and a resin B wherein the resin A has a glass transition temperature in a range of lower than 0° C., and the resin B has a glass transition temperature that exceeds 95° C.

2. The method for producing a transfer sheet according to claim 1, wherein a mass ratio of the resin A:the resin B is in a range from 50:50 to 90:10.

3. The method for producing a transfer sheet according to claim 2, wherein the resin A and the resin B are each, independently, a urethane-based resin or a (meth)acrylic-based resin.

4. A method for producing a transfer sheet, comprising:

forming an image by jetting an aqueous ink by an inkjet method onto a releasable support; and jetting an aqueous adhesive liquid by an inkjet method so that the aqueous adhesive liquid at least partially overlaps the image, wherein the aqueous adhesive liquid comprises: a resin A; and a resin B having a glass transition temperature that is at least 80° C. higher than a glass transition temperature of the resin A, the glass transition temperature of the resin B exceeds 95° C., and a mass ratio of the resin A:the resin B is in a range from 50:50 to 90:10.

5. A method for producing a transfer sheet, comprising:

forming an image by jetting an aqueous ink by an inkjet method onto a releasable support; and jetting an aqueous adhesive liquid by an inkjet method so that the aqueous adhesive liquid to at least partially overlaps the image, wherein the aqueous adhesive liquid comprises: a resin A; and a resin B having a glass transition temperature that is at least 80° C. higher than a glass transition temperature of the resin A, and the resin A and the resin B are each, independently, a urethane-based resin or a (meth)acrylic-based resin.

6. The method for producing a transfer sheet according to claim 5, wherein the glass transition temperature of the resin A is in a range of lower than 0° C., or the glass transition temperature of the resin B exceeds 95° C.

7. The method for producing a transfer sheet according to claim 5, wherein the glass transition temperature of the resin A is lower than 0° C., and the glass transition temperature of the resin B exceeds 95° C.

* * * * *